Patented Dec. 22, 1942

2,305,751

UNITED STATES PATENT OFFICE 2,305,751

DERIVATIVES OF P-SULPHONAMIDO ANILINE AND PROCESS FOR THE MANUFACTURE OF SAME

Kurt Warnat, Basel, Switzerland, assignor to Hoffmann-La Roche Inc., Nutley, N. J., a corporation of New Jersey No Drawing. Application April 1, 1939, Serial No. 265,599. In Switzerland April 26, 1938

11 Claims. (Cl. 260—397.7)

Sulphanilamide is very effective and much used in the treatment of streptococcal infections. It can only be administered orally, since injectable aqueous solutions thereof have not hitherto been known.

It has now been found that compounds of sulphanilamides yielding neutral, injectable, aqueous solutions can be obtained if sulphanilamides are heated with phosphorus oxyhalides and the resulting condensation products treated with ammonia or alkylamines. The sulphonamido-anilido-phosphamic acids thus obtained are themselves difficultly soluble in water, but their salts are soluble in water giving neutral solutions. The sulphonamido-anilido-phosphamic acids are of the following general formula

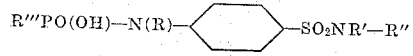

wherein R and R'' are each a radical selected from the group consisting of hydrogen and alkyl radicals, R' is a radical selected from the group consisting of alkyl, aryl and hydrogen, and R''' is a radical selected from the group consisting of amino, alkylamino and dialkylamino radicals.

Example 1

22 parts by weight of sulphanilamide hydrochloride are heated with 35 parts by weight of phosphorus oxychloride until it goes into solution. The reaction product solidifying on cooling is treated with warm benzene in order to remove any phosphorus oxychloride remaining unchanged during the reaction. The residue difficultly soluble in benzene is brought into 100 parts by weight of ice cold 10 per cent ammonia. On acidifying the ammoniacal solution, the free p-sulphonamido-anilido-phosphamic acid of the formula $NH_2SO_2C_6H_4NH—PO(OH)NH_2$ is isolated in a crystalline form. The compound is sucked off and dissolved in a dilute solution of caustic soda. The solution is treated with charcoal, filtered and again acidified. The phosphamic acid thus obtained is nearly colourless. It melts at 167–169° C. It is difficultly soluble in cold water and alcohol. On boiling with water for a short time it decomposes yielding sulphanilamide and phosphoric acid. The alkali salts, as well as the ammonium salt, are also easily soluble in cold water.

Example 2

30 parts by weight of sulphanilamide are boiled for 3 to 4 hours with 100 parts by weight of phosphorus oxychloride under reflux. A vigorous evolution of hydrogen chloride sets in, and after about an hour a clear, mobile solution is produced. This hot solution is stirred into 200 parts by weight of benzene, whereby surplus phosphorus oxychloride dissolves and the reaction product solidifies. In order to remove the remainder of the phosphorus oxychloride, the product is ground with a further 100 parts by weight of benzene. The resulting phosphoric acid dichloride is treated with ice cold mono-methyl-amine solution and the clear solution concentrated in vacuo to remove excess of methyl-amine. On acidifying, the p-sulphonamido-anilido-phosphoric acid methyl-amide is obtained, which is purified by dissolving in cold ammonia or soda solution and repeating the precipitation by acid.

Example 3

40 parts by weight of sulphanilamide hydrochloride are boiled with 100 parts by weight of phosphorus oxychloride for 2 to 3 hours under reflux. The solution obtained is evaporated in vacuo whereby the phosphoric acid dichloride-p-sulphonamido-anilide remains as a light crystalline mass in quantitative yield. By bringing the pulverised chloride into aqueous ammonia, a solution of the ammonium salt of p-sulphonamido-anilido-phosphamic acid described in Example 1 is obtained from which the free acid can be prepared by adding mineral acid with cooling. The acid is sucked off and transformed into the stable sodium salt. Part of the p-sulphanilamide can be recovered from the acid mother liquor after boiling for a short time and neutralising.

Example 4

15 parts by weight of N-benzyl-p-sulphonamido-aniline are heated with 30 parts by weight of phosphorus oxychloride and the solution added to a mixture of benzene and petroleum ether. The precipitated phosphamic acid dichloride is reacted with aqueous ammonia solution with cooling. The ammoniacal solution is concentrated in vacuo and the phosphamic acid precipitated by the addition of hydrochloric acid. The precipitated crude product is sucked off, dissolved in soda solution, the solution filtered and again precipitated. The N-benzyl-p-sulphonamido-anilido-phosphamic acid is soluble in alkalis giving a neutral solution.

Example 5

15.3 parts by weight of phosphorous oxychloride are dissolved in 30 parts by weight of benzene. While cooling and stirring a solution of 17.2 parts by weight of sulphanilamide in 50 parts by weight of dry pyridine is added drop by drop. The resulting red solution, together with the suspended matter, is introduced into concentrated ammonia with cooling. The ammoniacal solution is freed from benzene and pyridine by evaporation in vacuo. On acidifying the remaining aqueous solution, the p-sulphonamido-anilido-phosphamic acid described in Example 1 is precipitated.

I claim:

1. A compound of the general formula

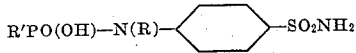

wherein R is a radical selected from the group consisting of hydrogen and aralkyl radicals, and R' is a radical selected from the group consisting of —NH$_2$ and NH—lower alkyl radicals.

2. p-Sulphonamido-anilido-phosphamic acid.

3. p - Sulphonamido - anilido - phosphoric acid methylamide.

4. N-benzyl- p - sulphonamido - anilido - phosphamic acid.

5. A process for the manufacture of compounds of the general formula

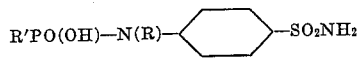

wherein R is a radical selected from the group consisting of hydrogen and aralkyl radicals, and R' is a radical selected from the group consisting of —NH$_2$ and —NH—lower alkyl radicals, comprising reacting sulphanilamides of the general formula

with phosphorus oxyhalides, and treating the reaction products with a base selected from the group consisting of ammonia and mono lower alkyl amines.

6. A process for the manufacture of compounds of the general formula

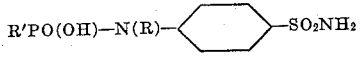

wherein R is a radical selected from the group consisting of hydrogen and aralkyl radicals, and R' is a radical selected from the group consisting of —NH$_2$ and —NH lower alkyl radicals, comprising reacting sulphanilamides of the general formula

with phosphorus oxyhalides, and treating the reaction products with a base selected from the group consisting of ammonia and mono lower alkyl amines while cooling.

7. A process for the manufacture of compounds of the general formula

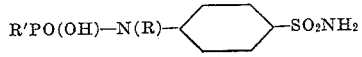

wherein R is a radical selected from the group consisting of hydrogen and aralkyl radicals, and R' is a radical selected from the group consisting of —NH$_2$ and —NH$_2$—lower alkyl radicals, comprising reacting sulphanilamides of the general formula

with phosphorus oxyhalides, treating the reaction products with a base selected from the group consisting of ammonia and mono lower alkyl amines, and acidifying the reaction mixture to precipitate the product formed.

8. Process for the manufacture of p-sulphonamido-anilido-phosphamic acid comprising reacting sulphanilamide with phosphorus oxychloride, treating the reaction product with ammonia and acidifying the reaction mixture to precipitate the product formed.

9. Process for the manufacture of p-sulphonamido-anilido-phosphoric acid methylamide comprising reacting sulphanilamide with phosphorus oxychloride, treating the reaction product with methylamine and acidifying the reaction mixture to precipitate the product formed.

10. Process for the manufacture of N-benzyl-p-sulphonamido-anilido-phosphamic acid comprising reacting N-benzyl-p-sulphonamido-aniline with phosphorus-oxychloride, treating the reaction product with ammonia and acidifying the reaction mixture to precipitate the product formed.

11. The step in the method of solubilizing para-amino-benzene sulphonamides which includes the reaction of a para-amino-benzene sulphonamide with a phosphorus oxyhalide to form a para-phosphamido-benzene-sulphonamide.

KURT WARNAT.